United States Patent
Shen (10) Patent No.: US 9,348,375 B1
(45) Date of Patent: May 24, 2016

(54) TOOL-LESS MOUNTING DEVICE FOR HARD DISK DRIVE

(71) Applicants: INVENTEC (PUDONG) TECHNOLOGY CORPORATION, Shanghai (CN); INVENTEC CORPORATION, Taipei City (TW)

(72) Inventor: Yu-Long Shen, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/609,608

(22) Filed: Jan. 30, 2015

(30) Foreign Application Priority Data

Nov. 10, 2014  (CN) .......................... 2014 1 0628197

(51) Int. Cl.
*G06F 1/16* (2006.01)
*G06F 1/18* (2006.01)

(52) U.S. Cl.
CPC ..................... *G06F 1/187* (2013.01)

(58) Field of Classification Search
CPC .............. G06F 1/16; G06F 1/187; H05K 5/00
See application file for complete search history.

(56) References Cited

U.S. PATENT DOCUMENTS

| | | | | |
|---|---|---|---|---|
| 6,667,879 B2 * | 12/2003 | Salinas | .................... | G06F 1/184 361/679.33 |
| 7,262,958 B2 * | 8/2007 | Marroquin | .............. | G06F 1/187 312/223.2 |
| 7,639,492 B2 * | 12/2009 | Thomas | .................. | G06F 1/187 361/679.33 |
| 7,983,032 B2 * | 7/2011 | Walker | ..................... | G06F 1/187 312/223.2 |
| 8,947,872 B2 * | 2/2015 | Chang | ..................... | G06F 1/187 361/679.02 |
| 8,971,036 B1 * | 3/2015 | Lau | ........................... | G06F 1/20 361/679.34 |
| 9,060,444 B2 * | 6/2015 | Deng | .................... | H05K 5/0204 |
| 9,105,309 B2 * | 8/2015 | Li | ......................... | G11B 33/128 |
| 9,134,754 B2 * | 9/2015 | Guo | ........................ | G06F 1/187 |
| 2008/0094794 A1 * | 4/2008 | Hass | ....................... | G06F 1/187 361/679.33 |
| 2008/0239651 A1 * | 10/2008 | Curnalia | ............. | G11B 33/122 361/679.34 |
| 2010/0079936 A1 * | 4/2010 | Bridges | ............... | G11B 33/126 361/679.02 |
| 2011/0173805 A1 * | 7/2011 | Richet | ................... | G11B 33/123 29/825 |
| 2011/0234064 A1 * | 9/2011 | Makley | ................... | G06F 1/187 312/236 |
| 2013/0201626 A1 * | 8/2013 | Bondurant | ........... | G06F 1/1658 361/679.58 |
| 2014/0016262 A1 * | 1/2014 | Lo | ........................... | G06F 1/187 361/679.33 |
| 2014/0237770 A1 * | 8/2014 | Chou | ....................... | G06F 1/16 16/110.1 |

* cited by examiner

*Primary Examiner* — Lisa Lea Edmonds
(74) *Attorney, Agent, or Firm* — Kirton McConkie; Evan R. Witt (57) ABSTRACT

A tool-less mounting device for hard disk drive (HDD) is provided. The mounting device has a tray, at least one flexible member, a backplane, and at least one HDD. The tray has a base and two sidewalls. The flexible member has a fixed portion and an arm. The backplane is disposed on the base between the sidewalls, and has a first connector and a second connector. The HDD is coupled to the first connector of the backplane.

6 Claims, 7 Drawing Sheets

TOOL-LESS MOUNTING DEVICE FOR HARD DISK DRIVE

BACKGROUND OF THE INVENTION

1. Field of the Invention

The present invention relates to a tool-less mounting device for hard disk drive (HDD) in the field of server technology. More specifically, it relates to a tool-less mounting device for HDD applicable to a HDD mounting bracket in a server.

2. Description of the Prior Art

As digital technology is more prevalent in everyday life thanks to the rapid development of platforms including the Internet, mobile Internet, broadcast and television network, and smart television (TV), the amount of data around the world is undergoing an explosive growth. To provide better online services, major enterprises of Internet services continue to build new data centers and purchase more storage servers to save the ever-growing data. The trend also underlines the importance of the maintenance of the HDDs in the storage servers.

HDD failures account for a sizable number of all the malfunctions of server hardware. When a HDD must be replaced due to having bed sectors, the cost of maintenance is high if the HDD was fastened by a conventional nut-and-bolt structure. And more importantly, it may affect related businesses of the enterprises providing Internet service. Therefore, it is crucial for server manufacturers to provide a structure that enables fast replacement of HDDs. At the same time, the structure must be as simple as possible so to avoid excessive costs.

SUMMARY OF THE INVENTION

An object of the present invention is to provide a tool-less mounting device for HDD. Instead of adopting the conventional nut-and-bolt fastening structure, the present invention provides a tool-less structure which enables fast HDD replacement. Furthermore, the structure of the device is simple so no excessive fee is incurred.

According to the present invention, a tool-less mounting device for hard disk drive (HDD) suitable to be installed in a HDD mounting bracket of a server is provided. The HDD mounting bracket comprises a circuit board equipped with a connector. The tool-less mounting device for HDD comprises a tray, one or more flexible members, a backplane and one or more HDDs. The tray comprises one base and two sidewalls, with the two sidewalls standing on opposite sides of the base, forming an installation space. Each flexible member comprises one side as a fixed portion and the other side bended by an angle and extended as an arm. The fixed portion is fastened to the sidewall along the direction it extends. The arm is installed with a dowel pin and a round portion on the end, with the dowel pin installed facing inside of the tray. The backplane is installed on the base between the two sidewalls and comprises one or more first connectors and a second connector. The one or more HDDs, are installed in the installation space and coupled to the first connector of the backplane. When the tool-less mounting device for HDD is inserted in the HDD mounting bracket along a first direction, the arm of the flexible member gradually changes from opening outwardly to closing inwardly due to elastic deformation as it touches the sidewall of the HDD mounting bracket and is gradually pressured. The arm of the flexible member closes when it is inserted into the sidewall of the HDD mounting bracket, with the dowel pin of the flexible member dowels one aligning hole of the HDD, and fastens the HDD on the tray, so that the second connector of the backplane is inserted in and coupled to the connector of the circuit board of the HDD mounting bracket. When the tool-less mounting device for HDD is extracted from the HDD mounting bracket along a second direction, the round portion of the flexible member assists the tool-less mounting device for HDD to slide out of the sidewalls of the HDD mounting bracket. The arm of the flexible member changes from closing inwardly to opening outwardly due to elastic deformation as it is detached from the HDD mounting bracket, and opens outwardly when it is removed from the sidewalls of the HDD mounting bracket. The second connector of the backplane is extracted and decoupled from the connector on the circuit board of the HDD mounting bracket. The dowel pin is detached from the aligning hole of the HDD and unfastens the HDD.

In one aspect of the present invention, the HDD is inserted into the first connector of the backplane along the first direction when the arm of the flexible member is opening outwardly, and be removed from the first connector along the second direction.

In another aspect of the present invention, the tool-less mounting device for HDD further comprises one or more light-emitting diodes (LEDs), fastened on the inner side of a front wall of the tray and coupled to the backplane to show a status of the HDD.

In another aspect of the present invention, the tool-less mounting device for HDD further comprises a turn-and-lock handle, with an axis installed on a corner where a front side of the tray and the sidewall meet, and fastened to the bottom of the base of the tray. When the tool-less mounting device for HDD is inserted into the HDD mounting bracket, the turn-and-lock handle is turned from the first position and locked at the second position, with the turn-and-lock handle and the HDD mounting bracket functioning to fasten the tool-less mounting device for HDD. When the tool-less mounting device for HDD is extracted from the HDD mounting bracket, the turn-and-lock handle is turned from the second position and locked at the first position, with the turn-and-lock handle and the HDD mounting device functioning to unfasten the tool-less mounting device for HDD.

In still another aspect of the present invention, a thumbscrew is installed on the turn-and-lock handle opposite to the axis to fasten the turn-and-lock handle to the front side of the tray when the turn-and-lock handle is at the second position.

In yet another aspect of the present invention, the fixed portion of the flexible member is fastened to the inner side of the sidewall of the tray, and the arm of the flexible member goes through the sidewall and extends outwards from the sidewall.

The advantages of the present invention are: automatic fastening of the HDD held in the tool-less mounting device for HDD when the device is inserted into the HDD mounting bracket, and automatic unfastening of the HDD when the tool-less mounting device for HDD is extracted from the HDD mounting bracket; a dowel pin to fasten the HDD by aligning holes on the side of the HDD; a commonly applicable structure that poses no specific restriction on the height of the HDD; a simple and cost-effective structure that fastens the HDD with a flexible member made of sheet metal instead of a plastic part; providing the users with the maximum discretion when employing storage devices, and meeting the goal of changing HDDs quickly and conveniently; enhancing the scalability of a system as it is capable of supporting a plurality of HDDs.

These and other features, aspects and advantages of the present disclosure will become understood with reference to the following description, appended claims and accompanying figures.

DETAILED DESCRIPTION OF THE PREFERRED EMBODIMENTS

The objects, features and advantages of the present invention are better illustrated by preferred embodiments of the present invention in combine with appended figures in the following texts. In addition, indications related to directions/positions, including up, down, top, bottom, front, back, left, right, inward, outward, sideway, around, central, parallel, horizontal, perpendicular, vertical, axial, radial, the topmost layer and the bottommost layer, are used in reference to the appended figures. Therefore, the direction/position indications were used to enhance the explanation and understanding of the present invention, instead of restricting the present invention.

The following is a detailed explanation in combine with appended figures of the tool-less mounting device for HDD of the present invention.

Figure 1:
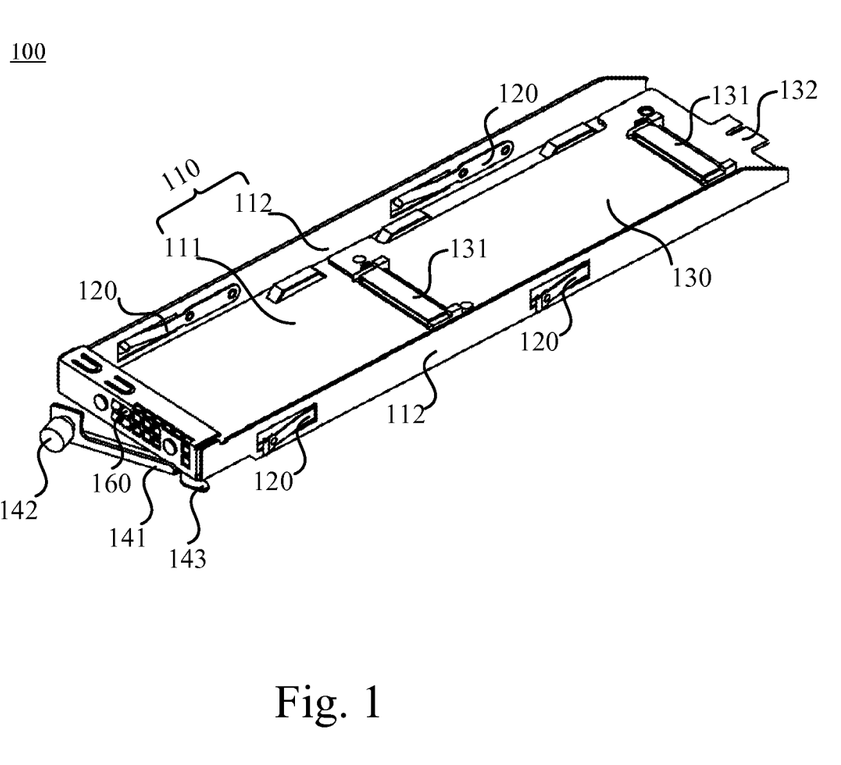
FIG. 1 is a diagram of a tool-less mounting device for HDD according to an embodiment of the present invention.
Figure 2:
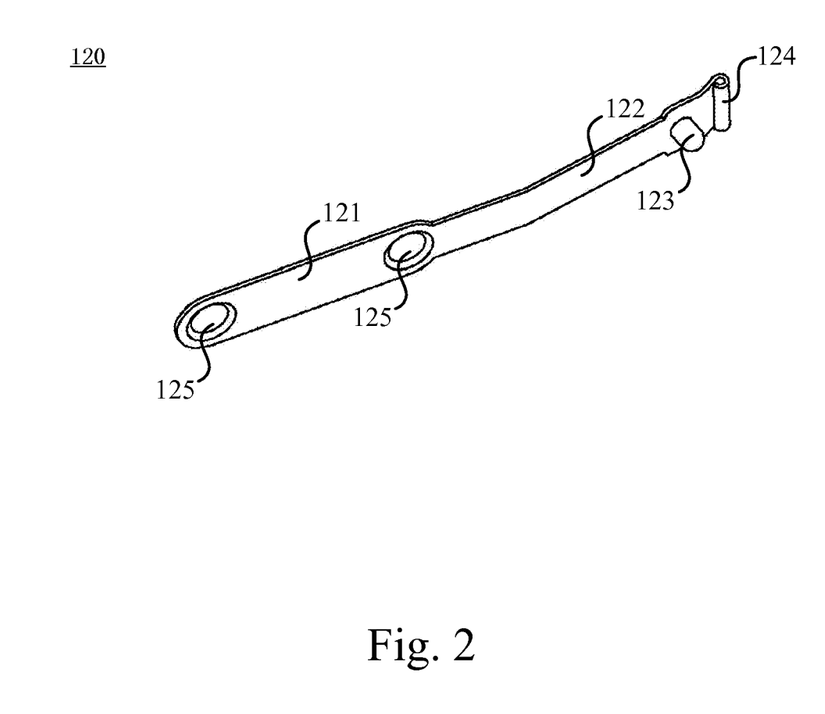
FIG. 2 is a diagram of a flexible member of an embodiment of the present invention.

FIG. 1 is a diagram of a tool-less mounting device for HDD according to an embodiment of the present invention. FIG. 2 is a diagram of a flexible member of an embodiment of the present invention.

Please refer to FIG. 1 and FIG. 2. A tool-less mounting device 100 for HDD can be installed in a HDD mounting bracket 200, which has a circuit board (not shown in the figures) equipped with a connector 210 (please refer to FIG. 5). The tool-less mounting device 100 for HDD comprises a tray 110, and one or more flexible members 120. The tray 110 comprises a base 111 and two sidewalls 112, disposed on both sides of the base 111, facing each other. An installation space is thus created among the base 111 and sidewalls 112 to accommodate one or more HDDs 150 (please refer to FIG. 3). In the present embodiment, the tool-less mounting device 100 for HDD comprises four flexible members 120, arranged in two pairs and disposed on opposite side of the sidewalls. The number of flexible members 120 is not limited to the present number in other embodiments.

Figure 6:
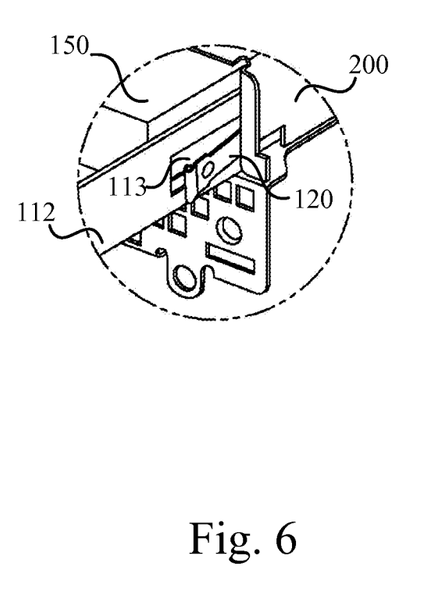
FIG. 6 is a diagram showing an enlargement of a portion A in FIG. 5.

Please refer to FIG. 1 and FIG. 2. Each flexible member 120 has a fixed portion 121, and another portion as an arm 122. The fixed portion 121 is utilized to fix the flexible member 120 on the inner side of the sidewall 112 of the tray 110. The fixed portion 121 has two or more mounting holes 125. Through mounting holes 125 and connecting members (not shown in the figure), one or more flexible members 120 can be fixed in the inner side of the sidewall 112. The connecting member can be a screw, a rivet, or other types of fasteners. In addition, on the sidewall 112 of the tray 110, there is a pair of slots 113 (as shown in FIG. 6) facing flexible members 120. The slot 113 extends between the arm 122 and the fixed portion 121, so that the arm 122 can freely pass through the slot 113 on the sidewall 112, and extend outwards from the sidewall 112 (i.e. to the direction further away from the HDD 150).

Because the flexible member 120 is made of sheet metal, the arm 122 has better elastic modulus. But the material of the flexible member 120 is not limited to the present invention. The directions to which the fixed portion 121 and the arm 122 extend form an angle, like a bend. When the tool-less mounting device 100 for HDD is in a normal and pressure-free situation (i.e. when it is not inserted into the HDD mounting bracket 200), the arm 122 of the flexible member 120 opens outwardly. When the tool-less mounting device 100 for HDD is inserting into the HDD mounting bracket 200 along a first direction, the arm 122 of the flexible member 120 gradually changes from opening outwardly to closing inwardly due to elastic deformation as it touches the sidewall of the HDD mounting bracket 200 and is gradually pressured in the process. The arm 122 of the flexible member 120 closes when it is inserted into the sidewall of the HDD mounting bracket 200. When the tool-less mounting device 100 for HDD is extracted from the HDD mounting bracket 200 along a second direction, the arm 122 of the flexible member 120 gradually changes from closing inwardly to opening outwardly due to elastic deformation, as it detaches and is gradually removed from the sidewall of the HDD mounting bracket 200.

Please refer to FIG. 2. A dowel pin 123, protruding outwardly and nearly perpendicular to the arm 122, is installed on one end of the arm 122. The dowel pin 123 is installed facing inside of the tray 110. When the tool-less mounting device 100 for HDD is inserted into the HDD mounting bracket 200 along the first direction (e.g. to the right) and the arm 122 of the flexible member 120 closes as it is inserted into the sidewall of the HDD mounting bracket 200, the dowel pin 123 of the flexible member 120 goes through the slot 113 on the sidewall 112 of the tray 110 (as shown in FIG. 6) and dowels the HDD 150 by an aligning hole (not shown in the figure) on the HDD 150. When the tool-less mounting device 100 for HDD is extracted from the HDD mounting bracket 200 along the second direction (e.g. to the left), the dowel pin 123 of the flexible member 120 detaches from the aligning hole on the HDD 150 so to unfasten the HDD 150. In other embodiments, when the fixed portion 121 of the flexible member 120 is installed on the external side of the sidewall 112, the size of the slot 113 only needs to be largest enough for the dowel pin 123 to go through the slot 113 to dowel the aligning hole on the side of the HDD 150. Note that in practice, as long as the dowel pin 123 of the flexible member 120 can dowel the aligning hole on the side of the HDD 150 and fasten the HDD 150 to the tray 100, there is no restriction on the height of the HDD 150. Therefore, the flexible member 120 can be applied widely.

Please refer to FIG. 2. The arm 122 further comprises a round portion 124, disposed at one end of the arm 122. When the tool-less mounting device 100 for HDD is extracted from the HDD mounting device 200 along the second direction (e.g. to the left), the round portion 124 is in touch with the sidewall of the HDD mounting device 200 throughout the process, so that the tool-less mounting device 100 for HDD can slide smoothly out of the sidewall of the HDD mounting bracket 200. It ensures that the tool-less mounting device 100 for HDD does not encounter bigger resistance because of the sidewall (not shown in the figure) of the HDD mounting bracket 200, so that the tool-less mounting device 100 for HDD can be removed from the HDD mounting bracket 200 quickly and conveniently.

Figure 3:
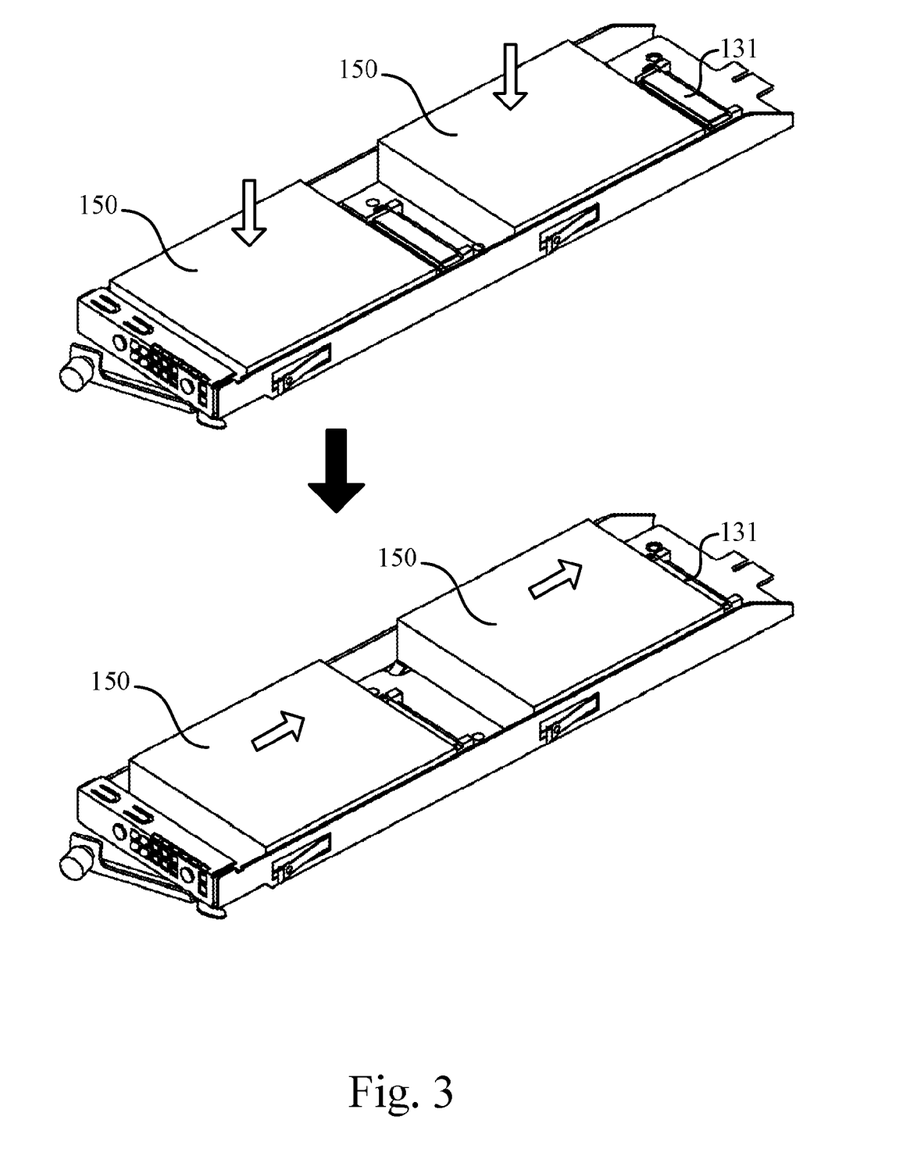
FIG. 3 is a diagram showing the HDD installed on to backplane of one embodiment of the present invention.

Please refer to FIG. 1. The tool-less mounting device 100 further comprises one or more backplanes 130, installed on the base 111 between the two sidewalls 112. The backplane 130 has one or more first connectors 131 and a second connector 132. When one or more HDDs 150 are installed in the installation space of the tool-less mounting device 100 for HDD, the HDD 150 is coupled to the first connector 131 of the backplane 130, as shown in FIG. 3. In other embodiments, when a plurality of HDDs 150 is installed in the installation space of the tool-less mounting device 100 for HDD, each HDD 150 is coupled to one corresponding first connector 131 of the backplane 130, therefore the plurality of HDDs 150 can be coupled in series. Thus through the plurality of first connectors 131 on the backplane 130, more HDDs 150 can be mounted on the tool-less mounting device 100.

When the tool-less mounting device 100 for HDD is inserted into the HDD mounting bracket 200 along the first direction, the second connector 132 of the backplane 130 is inserted in and coupled to a connector 210 of the circuit board of the HDD mounting bracket 200. When the tool-less mounting device 100 for HDD is extracted from the HDD mounting bracket 200 along the second direction, the second connector 132 of the backplane 130 is detached and uncoupled from the connector 210 of the circuit board of the HDD mounting bracket 200.

Note that in practice, the HDD 150 is first coupled to the first connector 131 of the backplane 130 inside the tool-less mounting device 100 for HDD, with the aligning hole on the HDD 150 to be doweled by the dowel pin 123 of the flexible member 120 installed corresponding to the aligning hole of the HDD 150, and completely fastened until the tool-less mounting device 100 for HDD is inserted into the HDD mounting bracket 200. In the present embodiment, the tool-less mounting device 100 has two HDDs 150. Therefore, two pairs of the flexible members 120 are installed facing each other to fasten the two HDDs 150 respectively. In other embodiments, when the tool-less mounting device 100 is installed with two or more HDDs 150, two or more pairs of the flexible members 120 are installed facing each other to fasten the two or more HDDs 150 respectively. Furthermore, a plurality of the flexible members 120 on the sidewalls 112 of the tray 110 are aligned to the same level to ensure that each HDD 150 fastened by each pair of flexible members 120 is at the same height.

Optionally, the tool-less mounting device 100 for HDD further comprises a turn-and-lock handle 141. An axis 143 of the turn-and-lock handle 141 is installed on a corner where a front side of the tray 110 and the sidewall 112 meet, and fastened to the bottom of the base 111 of the tray 110. When the tool-less mounting device 100 for HDD is inserted into the HDD mounting bracket 200, the turn-and-lock handle 141 turns from a first position (e.g. the direction the arm of the turn-and-lock handle 141 extends is approximately parallel to the direction the sidewall 112 extends) and locks at a second position (e.g. the direction the arm of the turn-and-lock handle 141 extends is approximately parallel to the direction the front side of the tray 110 extends). The function of the turn-and-lock handle 141 and the HDD mounting bracket 200 is to fasten the tool-less mounting device 100 for HDD. When the tool-less mounting device 100 for HDD is extracted from the HDD mounting bracket 200, the turn-and-lock handle 141 turns from the second position (e.g. the direction the arm of the turn-and-lock handle 141 extends is approximately parallel to the direction the front side of the tray 110 extends) and locks at the first position (e.g. the direction the arm of the turn-and-lock handle 141 extends is approximately parallel to the direction the sidewall 112 extends). The function of the turn-and-lock handle 141 and the HDD mounting bracket 200 is to unfasten the tool-less mounting device 100 for HDD. Furthermore, on the end opposite to the axis 143 of the turn-and-lock handle 141 is a thumbscrew 142. When the turn-and-lock handle 141 is at the second position, the thumbscrew 142 fastens the turn-and-lock handle 141 to the front side of the tray 110.

Optionally, the tool-less mounting device 100 for HDD further comprises a light-emitting diode 160, installed inside the front wall of the tray 110. The light-emitting diode 160 is coupled to the backplane 130 to show the status of the HDD 150.

Figure 4:
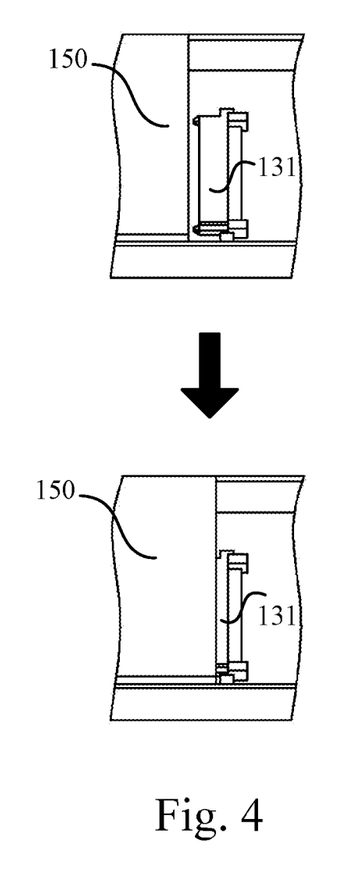
FIG. 4 is a diagram showing the HDD in the FIG. 3 connecting to the first connector.

FIG. 3 is a diagram showing the HDD installed on to backplane of one embodiment of the present invention. FIG. 4 is a diagram showing the HDD in the FIG. 3 connecting to the first connector.

When the arm 122 of the flexible member 120 is opening outwardly, the HDD 150 can be inserted into the first connector 131 of the backplane 130 along the first direction. Please refer to FIG. 3 and FIG. 4 for a more specific explanation. First, place the HDD 150 perpendicularly to the backplane 130, as shown by the arrow pointing downwards perpendicularly in the FIG. 3. Then, push each HDD 150 along the first direction, as shown by the arrows pointing right in the FIG. 3, so that one end of each HDD 150 is connected to the first connector 131 of the backplane 130. FIG. 3 and FIG. 4 show how quick and convenient it is to install the HDD 150 based on the method of the present embodiment. If installing one HDD 150 takes three seconds, then two HDDs 150 will take six seconds, and so on and so forth.

Figure 5:
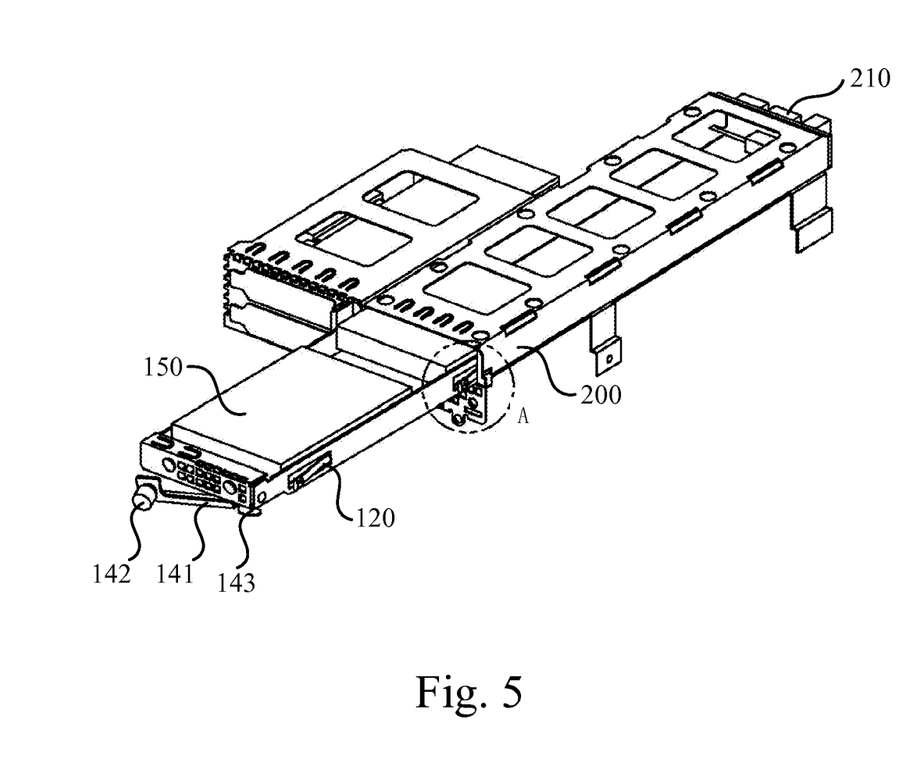
FIG. 5 is an assembly diagram of the tool-less mounting device of one embodiment of the present invention.
Figure 7:
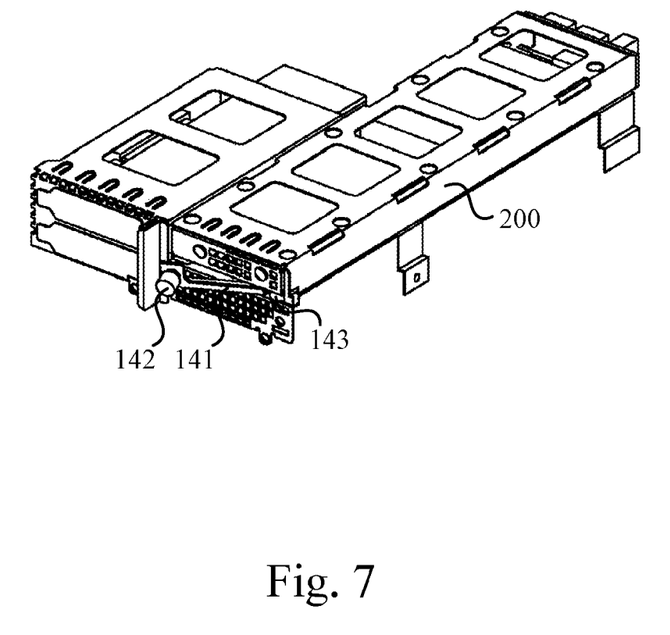
FIG. 7 is a diagram showing the tool-less mounting device for HDD of one embodiment of the present invention inserted in the HDD mounting bracket.

FIG. 5 is an assembly diagram of the tool-less mounting device of one embodiment of the present invention. FIG. 6 is a diagram showing an enlargement of a portion A in FIG. 5. FIG. 7 is a diagram showing the tool-less mounting device for HDD of one embodiment of the present invention inserted in the HDD mounting bracket.

Please refer to FIG. 5, FIG. 6 and FIG. 7. After the HDD 150 is installed on the backplane 130, the tool-less mounting device 100 for HDD must be installed in the HDD mounting bracket 200. When the tool-less mounting device 100 is inserted into the HDD mounting bracket 200 along the first direction, as shown in the portion A of the FIG. 5, the sidewall (not shown in the figures) of the HDD mounting bracket 200 is constraining, so that the arm 122 of the flexible member 120 is pressured by a force towards HDD 150. The arm 122 of the flexible member 120, because of elastic deformation, gradually changes from opening outwardly to closing inwardly, and closes as it is inserted into the sidewall of the HDD mounting bracket 200. Then, the dowel pin 123 of the arm 122 goes through the slot 113 and automatically dowels the HDD 150 by the aligning hole, thus the HDD 150 is fastened to the tray 110. No other fastening structure is needed during the process.

FIG. 7 and FIG. 1 show that the four flexible members 120 are closed due to the constraint of the sidewalls of the HDD mounting bracket 200. The dowel pin 123 on each flexible member 120 dowels the corresponding aligning hole of the HDD 150 to fasten the corresponding HDD 150. Lastly, the turn-and-lock handle 141 is turned from the first position and locked at the second position, with the thumbscrew 142 screwed so that the turn-and-lock handle 141 is fastened to the front side of the tray 110. Thus the function of the turn-andlock handle 141 and the HDD mounting bracket 200 is to fasten the tool-less mounting device 100 for HDD.

The previous paragraph describes the procedure of installing the HDD 150 and the tool-less mounting device 100 for HDD. The removal of the HDD 150 and the tool-less mounting device 100 for HDD adopts the same procedure but with steps followed in reverse. First, loosen the thumbscrew 142 and the turn-and-lock handle 141, and turns the turn-and-lock handle 141 from the second position and locks at the first position. The function of the turn-and-lock handle 141 and the HDD mounting bracket 200 is to unfasten the tool-less mounting device 100 for HDD. Then, when the tool-less mounting device 100 for HDD is extracted from the HDD mounting bracket 200 along the second direction, the round portion 124 of the flexible member 120 ensures that the tool-less mounting device 100 for HDD slides smoothly out of the sidewall of the HDD mounting bracket 200. The arm 122 of the flexible member 120 changes from closing to gradual restoration of its shape due to elastic deformation, as it is detached from the sidewall of the HDD mounting bracket 200. The arm 122 of the flexible member 120 continues to open outwardly until it is removed from the sidewall of the HDD mounting bracket 200. The second connector 132 of the backplane 130 is disconnected and uncoupled from the connector 210 on the circuit board of the HDD mounting bracket 200. The dowel pin 123 of the flexible member 120 is removed from the aligning hole of the HDD 150, so to unfasten the HDD 150. After the tool-less mounting device 100 is completely removed from the HDD mounting bracket 200 and the arm 122 of the flexible member 120 opens outwardly, the HDD 150 can be removed from the first connector 131 of the backplane 130 along the second direction (e.g. to the left). Thus, the HDD 150 is uncoupled from the first connector 131 to be changed. The whole process of changing HDDs seems to be quick and easy, and not tool is needed.

The present invention is capable of realizing an automatic fastening of the HDD 150 on the backplane 130 when the tool-less mounting device 100 for HDD is inserted in the HDD mounting bracket 200, and an automatic unfastening of the HDD 150 when the tool-less mounting device 100 for HDD is extracted from the HDD mounting bracket 200. In addition, the tool-less mounting device 100 for HDD features tool-less installation which provides users with the maximum discretion when employing storage devices, and meets the goal of changing the HDD 150 quickly and conveniently.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A tool-less mounting device for hard disk drive (HDD), suitable to be installed in a HDD mounting bracket of a server, the HDD mounting bracket comprising a circuit board equipped with a connector, the tool-less mounting device for HDD comprising:
    a tray, comprising one base and two sidewalls, with the two sidewalls standing on opposite sides of the base, forming an installation space;
    one or more flexible members, each flexible member with one side as a fixed portion and the other side bended by an angle and extended as an arm, the fixed portion being fastened to the sidewall along the direction it extends, the arm being installed with a dowel pin and a round portion on the end, with the dowel pin installed facing inside of the tray;
    a backplane, installed on the base between the two sidewalls, with one or more first connectors and a second connector; and
    one or more HDDs, installed in the installation space and coupled to the first connector of the backplane;
    wherein when the tool-less mounting device for HDD is inserted in the HDD mounting bracket along a first direction, the arm of the flexible member gradually changes from opening outwardly to closing inwardly due to elastic deformation as it touches the sidewall of the HDD mounting bracket and is gradually pressured; the arm of the flexible member closes when it is inserted into the sidewall of the HDD mounting bracket, with the dowel pin of the flexible member dowels one aligning hole of the HDD, and fastens the HDD on the tray, so that the second connector of the backplane is inserted in and coupled to the connector of the circuit board of the HDD mounting bracket;
    when the tool-less mounting device for HDD is extracted from the HDD mounting bracket along a second direction, the round portion of the flexible member assists the tool-less mounting device for HDD to slide out of the sidewalls of the HDD mounting bracket; the arm of the flexible member changes from closing inwardly to opening outwardly due to elastic deformation as it is detached from the HDD mounting bracket, and opens outwardly when it is removed from the sidewalls of the HDD mounting bracket; the second connector of the backplane is extracted and decoupled from the connector on the circuit board of the HDD mounting bracket; the dowel pin is detached from the aligning hole of the HDD and unfastens the HDD.

2. The tool-less mounting device for HDD of claim 1, wherein the HDD is inserted into the first connector of the backplane along the first direction when the arm of the flexible member is opening outwardly, and be removed from the first connector along the second direction.

3. The tool-less mounting device for HDD of claim 1 further comprising one or more light-emitting diodes (LEDs), fastened on the inner side of a front wall of the tray and coupled to the backplane to show a status of the HDD.

4. The tool-less mounting device for HDD of claim 1 further comprising a turn-and-lock handle, with an axis installed on a corner where a front side of the tray and the sidewall meet, and fastened to the bottom of the base of the tray; when the tool-less mounting device for HDD is inserted into the HDD mounting bracket, the turn-and-lock handle is turned from the first position and locked at the second position, with the turn-and-lock handle and the HDD mounting bracket functioning to fasten the tool-less mounting device for HDD; when the tool-less mounting device for HDD is extracted from the HDD mounting bracket, the turn-and-lock handle is turned from the second position and locked at the first position, with the turn-and-lock handle and the HDD mounting device functioning to unfasten the tool-less mounting device for HDD.

5. The tool-less mounting device for HDD of claim 4, wherein a thumbscrew is installed on the turn-and-lock handle opposite to the axis to fasten the turn-and-lock handle to the front side of the tray when the turn-and-lock handle is at the second position.

6. The tool-less mounting device for HDD of claim 1, wherein the fixed portion of the flexible member is fastened to the inner side of the sidewall of the tray, and the arm of the flexible member goes through the sidewall and extends outwards from the sidewall.

* * * * *